United States Patent
Strogov et al.

(10) Patent No.: US 12,242,609 B2
(45) Date of Patent: Mar. 4, 2025

(54) EXACT RESTORATION OF A COMPUTING SYSTEM TO THE STATE PRIOR TO INFECTION

(71) Applicant: Acronis International GmbH, Schaffhausen (CH)

(72) Inventors: Vladimir Strogov, Singapore (SG); Sergey Ulasen, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 302 days.

(21) Appl. No.: 17/656,940

(22) Filed: Mar. 29, 2022

(65) Prior Publication Data

US 2023/0315855 A1   Oct. 5, 2023

(51) Int. Cl.
*G06F 21/56* (2013.01)
*G06F 11/14* (2006.01)
*G06F 21/00* (2013.01)

(52) U.S. Cl.
CPC ........ *G06F 21/568* (2013.01); *G06F 11/1415* (2013.01); *G06F 2201/84* (2013.01); *G06F 2221/034* (2013.01)

(58) Field of Classification Search
CPC ............... G06F 21/568; G06F 11/1415; G06F 2201/84; G06F 2221/034; G06F 11/1469; G06F 2201/86; G06N 3/045; G06N 3/08; G06N 20/00
See application file for complete search history.

(56) References Cited

U.S. PATENT DOCUMENTS

| | | | | |
|---|---|---|---|---|
| 7,647,636 B2* | 1/2010 | Polyakov | ............... | G06F 21/566 717/124 |
| 8,667,328 B2* | 3/2014 | Liu | ....................... | G06F 11/1451 714/15 |
| 8,856,927 B1* | 10/2014 | Beloussov | ............ | G06F 21/568 726/23 |
| 9,317,686 B1* | 4/2016 | Ye | ........................... | G06F 21/568 |
| 9,355,247 B1* | 5/2016 | Thioux | .................... | G06F 21/53 |
| 10,417,420 B2* | 9/2019 | Zhang | ................... | G06F 21/562 |
| 10,460,099 B2* | 10/2019 | Golovkin | .............. | G06F 21/566 |
| 10,929,258 B1* | 2/2021 | Gauf | ........................ | G06N 20/20 |
| 11,068,194 B2* | 7/2021 | Melnikov | ............... | G06F 3/065 |
| 11,068,591 B2* | 7/2021 | Lundgren | ............. | G06F 21/566 |
| 11,249,791 B2 | 2/2022 | Sergeev et al. | | |

(Continued)

*Primary Examiner* — Edward Zee
(74) *Attorney, Agent, or Firm* — ESPE Legal Consultancy FZ-LLC

(57) ABSTRACT

The present disclosure relates to a system and method for creating a backup and restoring the exact clean system state prior to malware detection. The system includes a security system, in communication with one or more applications of a computing system, and a backup unit. The security system detects malware during execution of the applications or events based on a memory dump analysis. The backup unit creates a backup copy of the system state corresponding to each event, labels each copy and creates an index. When the security system detects presence of the malware at a particular event, the backup system parses the index, and with use of the labels, retrieves the exact backup copy that belongs to the event preceding the other event that caused the malware attack.

20 Claims, 4 Drawing Sheets

(56) References Cited

U.S. PATENT DOCUMENTS

| | | | |
|---|---|---|---|
| 11,698,808 B2 | 7/2023 | Sergeev et al. | |
| 11,789,766 B2 | 10/2023 | Sergeev et al. | |
| 2005/0193428 A1* | 9/2005 | Ring | G06F 21/57 |
| | | | 726/22 |
| 2018/0336086 A1* | 11/2018 | Vaden | G06F 11/3089 |
| 2020/0233837 A1* | 7/2020 | Morton | G06F 16/128 |
| 2020/0401489 A1* | 12/2020 | Mitkar | G06F 11/1469 |
| 2021/0026952 A1* | 1/2021 | Eggleton | G06F 21/554 |
| 2021/0150064 A1* | 5/2021 | Abali | G06F 21/64 |
| 2022/0291859 A1* | 9/2022 | Alpar | G06F 3/067 |
| 2022/0405163 A1* | 12/2022 | Patel | G06F 11/0751 |
| 2023/0409715 A1* | 12/2023 | Nissim | G06F 9/45533 |

\* cited by examiner

EXACT RESTORATION OF A COMPUTING SYSTEM TO THE STATE PRIOR TO INFECTION

FIELD OF THE INVENTION

The present disclosure generally relates to computer security systems. In particular the present disclosure relates to a system including a backup unit to create and store backup copies and retrieve exact clean backup copy upon detection of malware infection.

BACKGROUND OF THE INVENTION

Threat posed by malicious software, also known as malware, harms the computer systems to a great extent. Malware may come in many forms and behaviors that present a serious risk to millions of computer users, making them vulnerable to loss of data, identity theft, and loss of productivity, among others. To prevent malware attacks, many malware detection systems have been developed and implemented worldwide. Many forms of the malware can be detected even before infecting the computer system, and can be removed, thus protecting the computer systems from the malware attack. One of the most difficult malwares to detect is a rootkit.

The rootkit is malicious software used to install and hide other malicious programs inside a computer system. Standard anti-virus or anti-spyware often fail to detect the rootkits as the rootkits are programmed such that those are very difficult to detect through standard scans. The rootkits can be categorized as one of the following five types depending upon the location in the computing system in which the rootkit executes: (1) firmware, (2) hypervisor, (3) kernel, (4) library and (5) application.

Among numerous known malwares, the rootkit is considered as almost impossible to prevent or rather detect before its impact on the system. Therefore, it is crucial to restore the system effectively and quickly without consuming much system resources, post rootkit detection. It is also important to clean the system of related elements. For example, the infected elements which can restart a modified malicious process upon reboot needs to be eliminated. Hence, restoring the system state from a clean back-up copy is crucial.

Current technologies for restoring the systems create backups of the computing system states and the files to restore the system data in case of catastrophic failure, such as system operation failure, hard drive crash, or loss of power. Few technologies render full system recovery or a partial file recovery, such as selected files in case the user deleted the files mistakenly and wants to recover the deleted files. Partial recovery is feasible due to smaller data volume. However, in case of a full system recovery, large volumes of data processing and time required for unloading the entire back-copy is a major hurdle. Moreover, these techniques are not effective when dealing with infection of a computer by malicious software.

In a few current technologies, restoration involves finding a last clean copy or slice of a system by scanning each slice and iterating the scanning process. These systems are time consuming, lengthy, and inefficient. Moreover, the copy scanning may not reveal the presence of malware, especially rootkit infection detected on the system. If the system restores the copy with the presence of the malware, and the malware gets modified upon system reboot, the malware symptoms or behavior may be unknown to the system, and therefore, may not be detected during the scanning process.

Therefore, it is necessary to employ a system for restoring a system state from a clean backup copy that was created prior to infection while minimizing the operational costs of restoring a system from the backup copy. There exists a need for a system that labels each event and system backup in sequence so that the clean copy of the system state can be restored from an event preceding the event that caused the malware attack.

SUMMARY OF THE INVENTION

The present disclosure generally relates to a computer security system. In particular the present disclosure relates to a system including a backup unit to create and store backup copies and retrieve exact clean backup copy upon detection of malware infection. Just detecting an event that caused the malware attack and restoring the system state preceding the event may save significant time, resources involved in scanning and restoration.

The system and methods of the present disclosure mainly include a rootkit detection system, and associated backup unit implemented on a computing system, to restore the computing system at exact clean system state prior to the malware infection. The rootkit detection system is based upon a system dump sequence analysis. The rootkit detection system mainly includes a hardware processor to execute the operations of the computing system and capture the system memory dumps. A security system is connected to the hardware processor to receive system memory dumps and process the system memory dumps for detecting the rootkit or such malware infection, using a machine learning model.

The security system is coupled to a backup unit configured to create backup copies of a system and retrieve the backup copies for restoration of the system upon a fatal event, such as a system crash or a malware attack. The security system includes a system dump capture unit to create and export memory dumps corresponding to the system state. In an example, the memory dump of the system is binary data or text data representing memory state after disassembling binary data in a format that can be used by any system component for the purpose of monitoring system activities.

The present description, thus, renders a system that creates and stores backup copies of the system, markup and label each backup copy, and captures memory dumps which are analyzed to determine the presence of the infection. As the analysis of the memory dumps results in identification of an event that caused the infection, the exact backup copy preceding occurrence of that particular event can then be restored. Therefore, analyzing system dumps corresponding to particular events of event sequences, instead of scanning entire data of the backup copies, allow the system to retrieve the clean backup copy of the system that was created before the next event causing the rootkit infection. This approach of sequential marking of the backup copies in correspondence with the activity events eliminates the possibility of restoring the backup copy with the object elements coded with the malicious program.

In an embodiment, the hardware processor may produce at least a first memory dump and a second memory dump. In an implementation, the first memory dump corresponds to a clean memory dump, and the second memory dump corresponds to a malicious memory dump.

In an embodiment, the security system is communicatively coupled to the hardware processor to receive data related to application activity events being performed on the computing system. The security system includes a system event monitor, a system dump capture unit, and the rootkit detection engine.

In an embodiment, the system event monitor is configured to intercept and collect one or more application activity events of the computing system. Monitoring priority is allotted to the malicious applications or to the applications exhibiting malicious behavior.

In an embodiment, the system dump capture unit is configured to capture one or more memory dumps. The memory dump is a process of capturing the all-information content in RAM and stores it in a storage device. The information content can be accessed later, particularly, in case of application or system crash. The system dump capture driver captures one or more memory dumps corresponding to the application activity events being monitored by the system event monitor. For example, the first memory dump, corresponding to the clean memory dump, and the second memory dump, corresponding to the infected memory dump. Also, a system dump sequence is generated in response to the one or more application activity events in accordance with predefined security policy instilled within the rootkit detection system.

In an embodiment, the rootkit detection engine is configured to detect the rootkit threat. The rootkit detection engine mainly includes a rootkit detection unit and a machine learning model. The rootkit detection unit, in one implementation, is configured to collect the data related to one or more application activity events from the system event monitor, and the first memory dump, the second memory dump and the system dump sequence from the system dump capture unit. The rootkit detection unit, in one implementation, is further configured to compare respective vectors of the first memory dump and the second memory dump to generate differential memory dump in conjunction with the one or more application system events. The differential memory dump is an indicator of the difference between the first memory dump and the second memory dump representing the change in a system state due to software or user activity. A separate differential memory dump is generated corresponding to each event.

The machine learning model, in one implementation, is configured to receive the system dump sequence as a first data input, and the differential memory dump as a second data input from the rootkit detection unit, and a sequence of the one or more application events from the system event monitor. The machine learning model, in one implementation, is also configured to compare the first data input, the second data input and the third data input. The machine learning model is based on an artificial neural network that consists of two identical neural subnets with the same sets of weights. The network compares vectors of features of two objects in order to determine similarities of differences between the two or more vectors. In one implementation, the machine learning model is trained on a collection of known rootkits and clean files corresponding to memory dumps of uninfected systems. As a result of the training, the machine learning model is capable of differentiating the two or more vectors of two identical neural subnets, such as clean memory dump and infected memory dump. Based on the differentiation, the machine learning model is configured to cluster a system set, according to one implementation. The system state can be determined as being at, at least one of the three clusters, referred to as an infected system state, a suspicious system state and a clean system state.

In an embodiment, the security system is coupled to a backup unit configured to create a backup copy of the system and store the copy, mark, or label each copy in correspondence with the activity events, and retrieve the clean backup copy corresponding to an event preceding the event that caused the malware attack.

In an embodiment, the backup unit includes a storage device, a data agent, and an indexer.

In an embodiment, the backup unit can be implemented as a remote component.

In an embodiment, the backup unit labels or marks the copies in sequence corresponding to a system dump sequence.

In an embodiment, the one or more application event includes one or more system drivers file operations, one or more process interconnections, one or more buffer operations, one or more network communication related to running applications, one or more Application Programming Interface calls, and one or more system driver requests.

In an alternative embodiment, the system event monitor is configured to monitor the events that are indicators of attack and present in at least one threat behavior definitions or signatures.

In an embodiment, the system dump sequence is generated by the system event monitor to determine the relationship between the detected rootkit infection and an operation process that initiated the rootkit infection.

In an embodiment, a third memory dump, corresponding to a test environment, is collected by the rootkit detection engine for at least one sample rootkit infection in a collection of malwares belonging to a rootkit family before initiating a threat sampling process.

In an embodiment, the machine learning model trains on a collection of known malwares, corresponding to a rootkit family, and clean files, corresponding to one or more memory dumps of an uninfected computing system.

In an embodiment, the machine learning model is based on an artificial neural network.

It should be noted that the system described above is operated by one or more method steps implemented in and executed by the system comprising a hardware processor. Alternatively, the method steps may be implemented using computer executable instructions of a non-transitory computer readable medium.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

To provide an overall understanding of the systems and methods described herein, certain illustrative embodiments will now be described, including systems and methods for storing trusted data at a cloud storage service. However, it will be understood that the systems and methods described may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out amongst the various computing devices.

Computer programs described in some embodiments of the present invention may be stand-alone software entities or sub-entities (e.g., subroutines, code objects) of other computer programs. Unless otherwise specified, a target object is a file or a process residing on a client computer system. Computer readable media encompass non-transitory media such as magnetic, optic, and semiconductor storage media (e.g., hard drives, optical disks, flash memory, DRAM), as well as communications links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

Aspects of the system and methods described herein provide a system to detect rootkit infection, during execution of the system process, based on a system dump sequence. In general, a rootkit is regarded as one the most difficult malware to detect. It is impossible to detect a rootkit infection during the injection process. Therefore, it is necessary to identify the threat during its execution. The present disclosure collects one or more memory dumps and analyzes the memory dump in conjunction with a system dump sequence and application events. A machine learning model, which is trained on the collection of clean files and known threats, is configured to differentiate between a clean memory dump and an infected memory dump. Based on the differentiation, the system can determine whether the system is infected or not.

Figure 1:
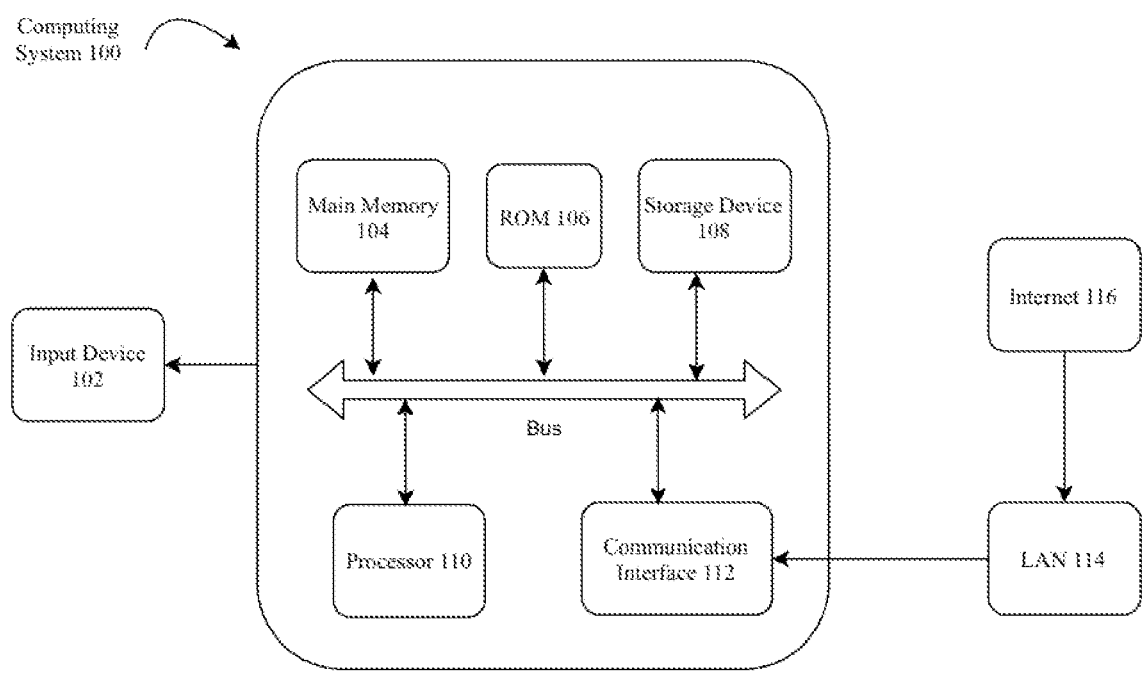
FIG. 1 shows a block diagram that illustrates an environment for a system implementation, in accordance with an embodiment.

FIG. 1 shows a block diagram that illustrates an environment for a system implementation. The system includes a computing system connected to the Internet. Such configuration is typically used for computers (hosts) connected to the Internet and executing a server or a client (or a combination) software.

The computing system includes a bus, an interconnect, or other communication mechanism for communicating information, and a processor 110, commonly in the form of an integrated circuit, coupled to the bus for processing information and for executing the computer executable instructions. The computing system may also include a main memory 104, such as a Random Access Memory (RAM) or other dynamic storage device, coupled to the bus for storing information and instructions to be executed by the processor 110. The main memory is also used for storing temporary variables or other intermediate information during execution of instructions to be executed by the processor 110. The computing system may further include a Read Only Memory (ROM) 106 (or other non-volatile memory) or other static storage device coupled to the bus for storing static information and instructions for the processor 110. A storage device 108, that may be a magnetic disk or optical disk, such as a hard disk drive (HDD) for reading from and writing to a hard disk, a magnetic disk drive for reading from and writing to a magnetic disk, or an optical disk drive (such as DVD) for reading from and writing to a removable optical disk, is coupled to the bus for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program models and other data for the general-purpose computing devices.

Typically, the computing system includes an Operating System (OS) stored in a non-volatile storage for managing the computer resources and provides the applications and programs with an access to the computer resources and interfaces. An operating system commonly processes system data and user input and responds by allocating and managing tasks and internal system resources, such as controlling and allocating memory, prioritizing system requests, controlling input and output devices, facilitating networking and managing files.

The term "processor 110" is used herein to include, but not limited to, any integrated circuit or any other electronic device (or collection of electronic devices) capable of performing an operation on at least one instruction, including, without limitation, a microprocessor (µP), a microcontroller (µC), a Digital Signal Processor (DSP), or any combination thereof. A processor 110 may further be a Reduced Instruction Set Core (RISC) processor, a Complex Instruction Set Computing (CISC) microprocessor, a Microcontroller Unit (MCU), or a CISC-based Central Processing Unit (CPU).

A memory can store computer programs or any other sequence of computer readable instructions, or data such as files, text, numbers, audio, and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively, or in addition, a memory may be in the form of a packaged functional assembly of electronic components (model). Such model may be based on a Printed Circuit Board (PCB) such as PC Card according to Personal Computer Memory Card International Association (PCMCIA) PCMCIA 2.0 standard, or a Single In-line Memory Model (SIMM) or a Dual In-line Memory Model (DIMM), standardized under the JEDEC JESD-21C standard. Further, a memory may be in the form of a separately rigidly enclosed box such as an external Hard-Disk Drive (HDD).

The computing system commonly includes a communication interface 112 coupled to the bus. The communication interface 112 provides a two-way data communication coupling to a network link that is connected to a Local Area Network (LAN). For example, the communication interface may be an Integrated Services Digital Network (ISDN) card or a modem to provide a data communication connection to a corresponding type of telephone line.

Figure 2:
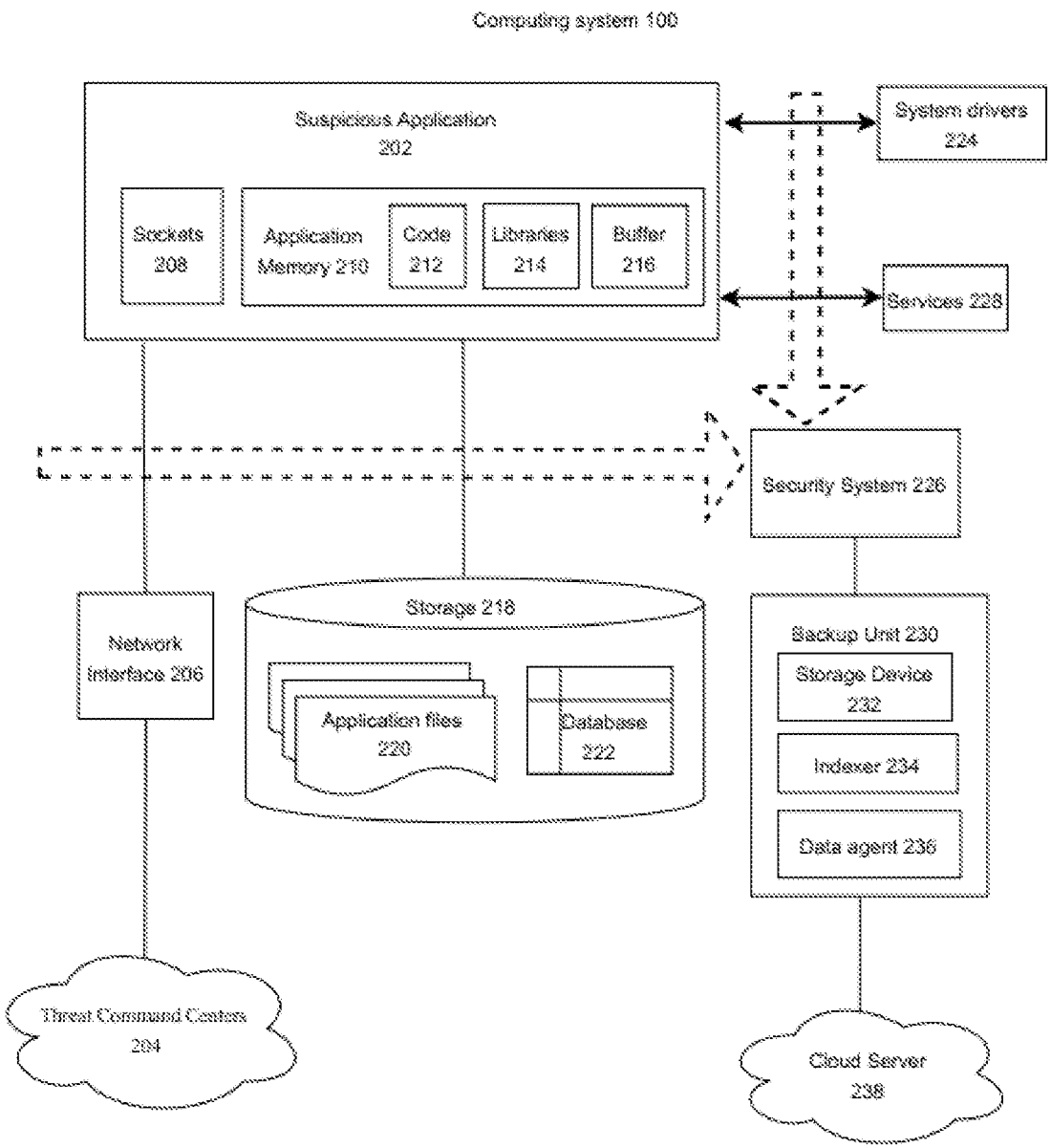
FIG. 2 describes a functional block diagram of the computing system having a security system and a backup unit implemented on it, in accordance with the embodiment.

FIG. 2 describes a functional block diagram of computing system 100 having a security system 226 implemented on it.

In one implementation, security system 226 is implemented on a virtual machine. Computing system 100 may include one or more system applications. Application 202 may get into communication with a threat command center 204 through one or more network interfaces 206. Threat command center 204 is a collection of malwares, threats, viruses, rootkit malfunctions and similar kind of program file that may cause the malfunction in computing system 100. Such malware may infect at least one application 202 and cause malfunctioning. Such applications are—referred to as infected applications, or if the cause of the malfunction is not determined, application 202 is treated as a suspicious application 202 and analyzed further.

As shown in FIG. 2, application 202 is designed and configured to manage the resources of the system, such as memory and process management, security, and the like. Applications are specifically configured to implement and execute the user's requirement for performing a specific task. Application code 212 may be written in a low-level language like a machine or assembly language. Computing system 100 may implement one or more types of applications. The applications can be broadly categorized into different types. Examples of the broad classification of general application may include, but may not be limited to, Web browsers, Presentation software, Spreadsheet software, Graphic software, Word processors, Database software, Multimedia software, Education software, Information software, and Content access software.

According to an embodiment, application 202 may include a socket 208 and an application memory 210. Socket 208 is a software entity that provides basic building blocks for inter-process communications, and functions as an end-point of communication between application processes. Socket 208 uniquely identifies a connection between two communicating sides by an identifier including a network address and a network port, wherein the network address refers to address of an entity creating socket 208, e.g., an application process, and the network port refers to a communications port of this entity as known to other entities in the network. Sockets may generally be created by the underlying operating system (not shown) in the context of which application is running. Once a socket 208 is created, the application process may connect with another socket 208 associated with another application process, and thus establish a network connection with the other application process. Once socket 208 connection has been established between two applications or two application processes, messages and data can be sent between the applications or processes using a selected network transmission protocol. In other words, a socket 208 is a component of an application program interface (API) that allows applications running on data processing systems in a network to communicate with each other. It identifies a communication endpoint in a network and can be connected to other socket 208s in the network. An application 202 or process may place data in a first socket that it has created and send the data to another socket connected to the first socket, thereby transmitting data to another application or process that has established the second socket. These sockets 208 hide the protocol of the next lower layer in the underlying network architecture from the processes when performing the communication between the processes.

As described, socket 208 is configured for establishing communication with other application processes. According to the same embodiment, the application memory 210 is implemented and compartmentalized to provide one or more memory sections for storing code 212, libraries 214, and buffer 216. In one implementation, the application memory 210 can be magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Application memory 210, in accordance with the embodiment, may store code 212. Typically, codes, which may be referred to as an application program, are constructed by combining segments of program code 212 obtained from different sources. Library 214 stores predefined instructions required for execution of functions associated with the application. For example, library 214 may include instructions for data exchange with client devices using one or more sockets 208 along with enabling data exchange with HTTP proxy using multiple pointers.

According to the embodiment, application 202 may get in communication with threat command center 204 via network interface 206. Computing system 100 may include one or more network interfaces 206 or network adapters for communicating with the remote computers via one or more networks, such as a local-area computer network (LAN), a wide-area computer network (WAN), an intranet, and the Internet. Examples of the network interface may include an Ethernet interface, a Frame Relay interface, SONET interface, and wireless interfaces.

According to an embodiment, the storage is provided to store one or more application files 220 and to provide database 222 for the application.

According to the embodiment, each of the one or more applications is connected to system drivers 224, referred to as a device driver interchangeably. The device driver provides a programmable software interface to hardware devices, enabling operating systems and the one or more applications to access hardware functions without needing to know precise details about the hardware being used.

In one implementation, the device driver may communicate with the computer hardware by computer subsystem or computer bus connected to the hardware. In another implementation, device drivers 224 may communicate with one or more peripheral devices connected to the computing system 100 externally. According to an embodiment, various types of device drivers 224 are implemented. Examples of the type of drivers 224 may include, but not limited to, kernel-mode device driver, User-mode device driver, and virtual device driver.

The one or more applications, in accordance with an embodiment, are in communication with one or more system services. Examples of the services include, but may not be limited to, program execution, I/O operations, file system manipulation, communication, error detection resource allocation, and protection.

The application, as described with reference to FIG. 2, is connected with device drivers 224, the one or more services, and storage device 232. In case, if application 202 is attacked by any kind of threat from the threat command center 204 via network interface 206, application 202 may get infected and may start malfunctioning. Computing system 100 may implement a security system 226 to monitor, detect and prevent malicious attacks. Security system 226 may detect malicious behavior of a suspicious application 202 and analyze one or more aspects of the application related to the malfunctioning/threat to determine the malware. In one particular embodiment, security system 226 is trained to determine the rootkit. Upon detection of the rootkit, a rootkit detection alert 228 is sent to computing system 100.

Security system 226, is coupled to a backup unit 230. Backup unit 230, according to one embodiment, may include a storage device 232, an indexer 234, and a data agent 236, and is configured to create and store backup copy of the system on storage device 232, and retrieve the backup copy in response to restoration of the system after malware detection.

In one implementation, storage device 232 is configured to communicate with the security unit to back up the data from the hardware processor and restore the data under various circumstances. The backup data are created and stored according to one or more security rules that may specify particular sectors of storage device 232 to store the backup copy slices that are authorized to be backed up. When the data from storage device 232 requires restoration, the appropriate sectors of storage device 232 are retrieved.

Typically, such backup unit 230 employ scanning components to scan the entire data for infections or malwares. As standard anti-malware programs are ineffective against the rootkit, according to the present embodiment, backup unit 230 is implemented in conjunction with the security unit. Back data from backup unit 230 is written to storage device 232 to avoid using the file system mechanisms of operating system, which may be infected with malware In one implementation, one or more secured processes are used to restore data from storage device 232. Meta data for each backup is maintained and indexed with correspondence to system dump sequence and activity event logs. The backup copy corresponding to each event may include at least one of a label, a marking number, the date and time the backup was created, and the event details that is associated with the backup copy, or the combination thereof.

In one implementation, storage device 232 is an integral part of the backup unit 230 or a dynamic memory storage connected to the backup unit 230, such as flash storage, a disk drive, a hard-disk storage array, solid state memory, etc. This type of storage device 232s is highly changeable or is intended for relatively short-term retention (e.g., hours, days, or weeks). According to some embodiments, the computing device may access the backup data stored in storage device 232 by making conventional file system calls via the operating system and security unit 226.

In another implementation, storage device 232 is located remotely from backup unit 230, such as on cloud server 238. If storage device 232 is located on a network, backup unit 230 may use out-of-band network connectivity to access storage device 232 to avoid using the operating system kernel network device drivers which is infected with malware. This out-of-band network connectivity is implemented in one embodiment using Active Management Technology (AMT), which may allow use of an HTTPS, iSCSI, NFS, or CIFS client to access the storage device 232 by directly accessing the network card.

The server, in few examples, is operating on a network and may implement a cloud computing scheme. The server is configured to store security policy and configured to communicate with backup unit 230 in accordance with the security policy rules.

In yet another implementation, storage device 232 is dedicated or shared. In some cases, storage device 232 is an integral component of computing device 100, such as a local disk drive. In other implementation, one or more storage device 232s, controlled by a single backup unit 230, can be shared by multiple computing devices, for example, via a local network or in a cloud storage implementation. This particular implementation is implemented on an enterprise network, where one or more computing systems are connected in a local area network connection and a single security unit is shared by the enterprise network. In such a scenario, at least one storage device 232 is allocated to one computing system. All storage device 232s will be controlled by backup unit 230 associated with security system 226.

In another implementation, storage device 232 can be a storage array shared by a group of computing devices, such as EMC Clarion, EMC Symmetrix, EMC Celerra, Dell EqualLogic, IBM XIV, NetApp FAS, HP EVA, and HP SPAR.

Security unit 226, in communication with storage device 232, is capable of: routing or storing the backup data to storage device 232, coordinating the routing or storing of data to primary storage device 232, retrieving the backup data from storage device 232, coordinating the retrieval of the backup data from storage device 232, and modifying and/or deleting data in storage device 232.

In accordance with an embodiment, backup unit 230 is configured to label or mark the backup data and create an index by indexer 234. As described earlier, the backup data refers to a backup copy of a system. The backup copy may include structured information corresponding to various applications, processes, events and/or operations being performed on the system. In one implementation, the backup copy can be created in response to event patterns. For example, downloading a PDF file is an event. The system state at the time of occurrence of the event is stored as backup A. There may be multiple events occurring thereafter, for example, opening an ABC weblink, downloading a XYZ video file, and the like. In such instances, a system state corresponds to an event, and all system states are indexed sequentially as per the activity event sequence. Indexing, labeling, or marking each of the backup copies allows the security system to browse the exact system state corresponding to the event preceding the event causing the malware attack. For example, if downloading the video file is a root cause of the rootkit component entering into the system, the security unit may identify which event caused the attack, and access backup unit 230 to retrieve the exact backup copy that was created before the event causing the infection. The exact location of a backup copy corresponding to the prior event, thus, can be located using the index.

After creation of the index, in accordance with one embodiment, a pointer or other location indicia (e.g., a stub) is placed in storage device 232 or backup unit 230, to indicate the current location of a particular backup copy corresponding to the prior event.

In one embodiment, storage operations, such as storing the backup copies, is performed according to various storage preferences, for example, as expressed by a user preference or a storage policy. A storage policy is generally a data structure or other information source that includes a set of preferences and other storage criteria associated with performing a storage operation. The preferences and storage criteria may include, but are not limited to, a storage location (or a class or quality of storage location), deduplication requirements, relationships between system components, network pathways to utilize in a storage operation, retention policies, data characteristics, compression or encryption requirements, preferred system components to utilize in a storage operation, the estimated or historic usage or cost associated with operating system components, frequency or use/access/etc. various time-related factors, single-instancing and/or deduplication information, and other criteria relating to a data storage or management operation. For example, a storage policy may indicate that certain data is to be stored in storage device 232, copied to storage device 232 raw using a specified method of indexing, labeling, or marking.

Backup unit 230 comprises data agent 236 which is a set of executable programming instructions and hardware components required to execute the instructions, or some combination of instructions, and is responsible for storage operations, such as copying, archiving, migrating, and recovering data stored in the storage unit. Data agent 236, in one implementation, may implement the security policy. In another implementation, data agent 236 may deploy a pointer to access the exact memory location to retrieve a particular backup copy.

Figure 3:
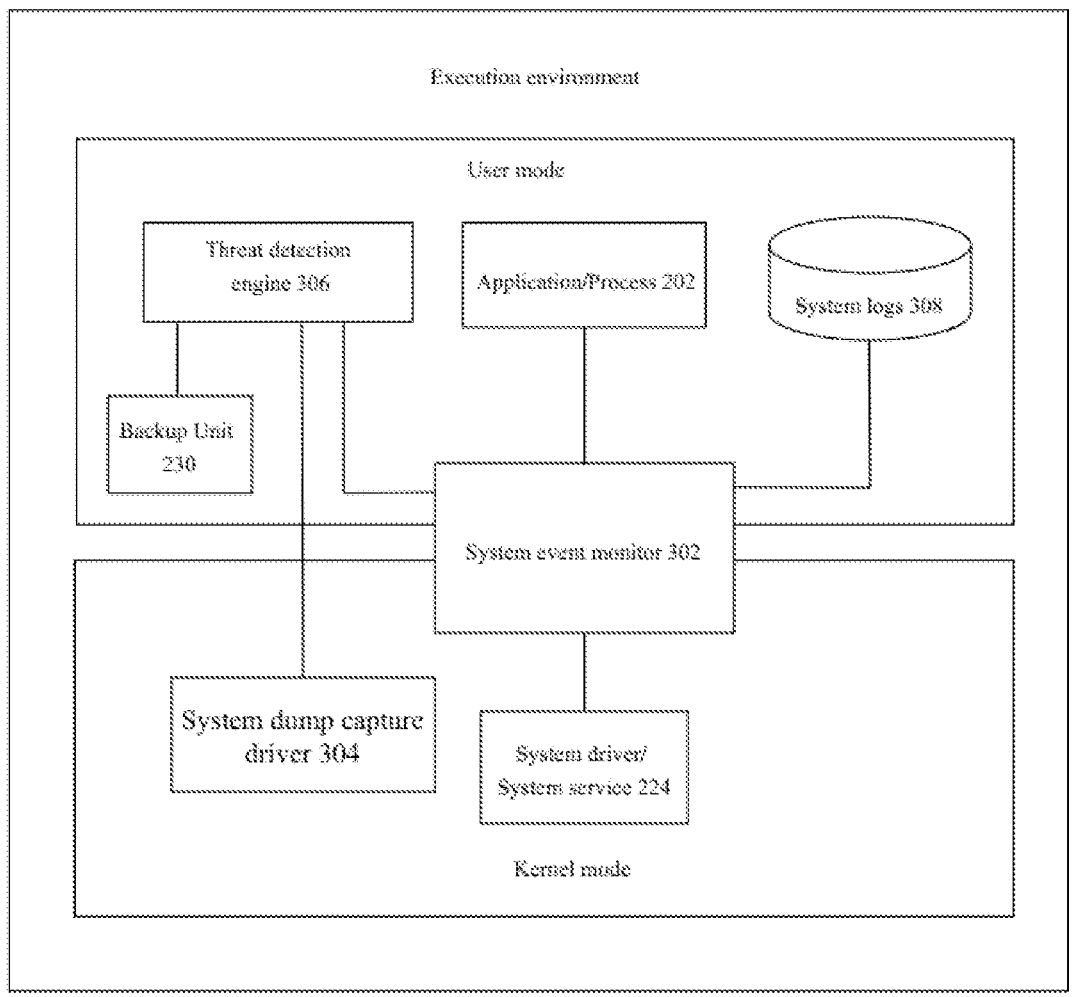
FIG. 3 illustrates functional blocks describing the security system, in accordance with the embodiment.

FIG. 3 illustrates functional blocks describing the security system, in accordance with one embodiment. Security system 226 mainly includes, but may not be limited to, a system event monitor, a system dump capture driver, and a threat detection engine. Security system 226 is configured to monitor the one or more applications running on computing system 100 and determine if any process of application 202 has been attacked by the rootkit. Such applications are denoted as suspicious applications.

According to an embodiment, the system event monitor is used in either real-time, on demand, or on a schedule, to receive attributes related to the one or more events and an application activity log containing a list of activities performed by the one or more applications. Some examples of the event include login into some particular application, capturing data using a capturing application, accessing a web-link, and the like. In an aspect, considering external peripheral devices connected to computing system 100, the event is an access door unlocking or locking, capturing data using CCTV cameras, accessing and controlling network devices or storage devices 232 connected to computing system 100. The events are sent in any number of formats to application activity log 308 unit. Application activity log 308, in one implementation, is configured to create a log of system events. System event monitor 302, according to an embodiment, is configured to receive event related information from an application activity log 308. System event monitor 302 can integrate with the operating system to monitor various log entries, such as authentication events. System event monitor 302 is communicatively coupled to system dump capture driver 304 and threat detection engine 306.

According to the embodiment, the system capture driver is configured to generate one or more memory dumps. A memory dump involves capturing all of the information stored in the random-access memory (RAM) and writing it to a storage drive. The memory dumps are typically used to gather diagnostic information subsequent to a crash for troubleshooting purposes. Using the built-in kernel functions of the operating system, the systems and methods described herein involve producing at least two memory dumps referred to as a first memory dump which are raw dumps associated with clean kernel function, and a second memory dump which are system dumps associated with infected kernel function. The information captured by the memory dump may include code 212 image of the malicious content suspect, content of a memory region that has been allocated by the malicious content suspect (e.g., heaps, threads, context), data accessed by the malicious content suspect, embedded content extracted or downloaded during the execution, such as a file or another executable binary, as well as information identifying certain activities performed by the malicious content suspect. The memory dump is then analyzed to determine whether the malicious content suspect is indeed malicious by threat detection engine 306. The memory dump is stored in threat detection engine 306 and analyzed subsequently for malicious content detection. The system capture driver may further be configured to create a system dump sequence.

Threat detection engine 306, according to an embodiment, is configured to receive one or more system dumps and a system dump sequence from the system capture driver to analyze, and subsequently, determine whether application 202 has been infected by the rootkit or not.

As described earlier, system event monitor 302 captures attributes and information related to one or more system events. The captured data is provided to system dump capture driver 304 to produce system dump sequence. First memory dump, second memory dump, and the system dump sequence is received by the rootkit detection unit. Further, the data related to one or more application activity events is received by the rootkit detection unit from the system event monitor.

According to one embodiment, threat detection engine 306 is configured to detect the rootkit threat and may include a rootkit detector and a machine learning model. The rootkit detector is communicatively coupled to the machine learning model for rootkit detection.

The rootkit detector, in one implementation, is configured to collect the one or more application activity events from system event monitor 302, and the first memory dump, the second memory dump and the system dump sequence from system dump capture driver 304. The first memory dump may correspond to a clean memory dump, which is a memory dump of a process which has not been infected. The second memory dump may correspond to an infected memory dump containing rootkit infection.

In an implementation, the rootkit detector is configured to compare the respective vectors of the first memory dump and the second memory dump to generate a differential memory dump in conjunction with the one or more application system events. The differential memory dump is indicative of the difference between the first memory dump and the second memory dump. According to an embodiment, rootkit detector 402 is based and trained on machine learning model 404.

Machine learning models, in one implementation, can be based on the Siamese neural network. The Siamese neural network is a type of artificial neural network that consists of two identical neural subnets with the same set of weights. This type of network allows a user to compare the vectors of features of two objects in order to highlight their semantic similarity or difference. Siamese neural network is a non-linear display of data with the aim of bringing similar objects closer to each other and spreading different objects as far as possible. This type of machine learning model 404 allows a user to compare data of different types and determine their relationship. In one implementation, the Triplet network is implemented. The triplet network compares clean and infected dumps with system requests or buffers in I/O operation and can produce a model that can determine the significant features of the buffer that identifies threats with less false positives.

According to an embodiment, the machine learning model is configured to receive the system dump sequence as a first data input, and the differential memory dump as a second data input from the rootkit detection unit, and a sequence of the one or more application events from the system event monitor. The machine learning model may analyze all data in view of different machine learning algorithms. In an implementation, the machine learning model is configured to compare the first data input, the second data input, and the third data input. The machine learning model is further configured to cluster a system state, based on the comparison, into at least three clusters. According to one implementation, the at least three clusters are an infected system state, a suspicious system state and a clean system state. The infected system state may indicate the system has been infected. The suspicious system state may indicate that the system might have been infected and may have been analyzed further for rootkit detection. The clean system state may indicate that the system has not been infected by the rootkit.

Backup unit 230 is configured to store the backup copies of the system dump corresponding to respective activity events in storage device 232, indexer 234 labels each copy of the system dumps and creates the index, and data agent 236 executes the operations, such as retrieving the exact backup copy from storage device 232. The security unit, first, identifies a suspicious activity event, for example, event A. Backup unit 230, upon identification of the suspicious event, accesses the index to find the memory location of the stored backup copy corresponding to the event preceding the event A. As the event A may have introduced the malware component, the system state prior to the occurrence of event A must be clean. The security system, thus, can retrieve the clean backup copy directly by referring to the index, without having to scan the entire data for finding the clean copy thereby. Thus, backup unit 230 saves time and resources that may have been consumed for scanning and parsing the entire data.

In an embodiment, computing system 100 is implemented in a user mode and a kernel mode. In the user mode, threat detection engine 306, application execution and operations, and system log generation may function. In kernel mode, system dump capture driver 304 and the system service is operated. The system event monitor 302 functions at both the user mode and the kernel mode.

Figure 4:
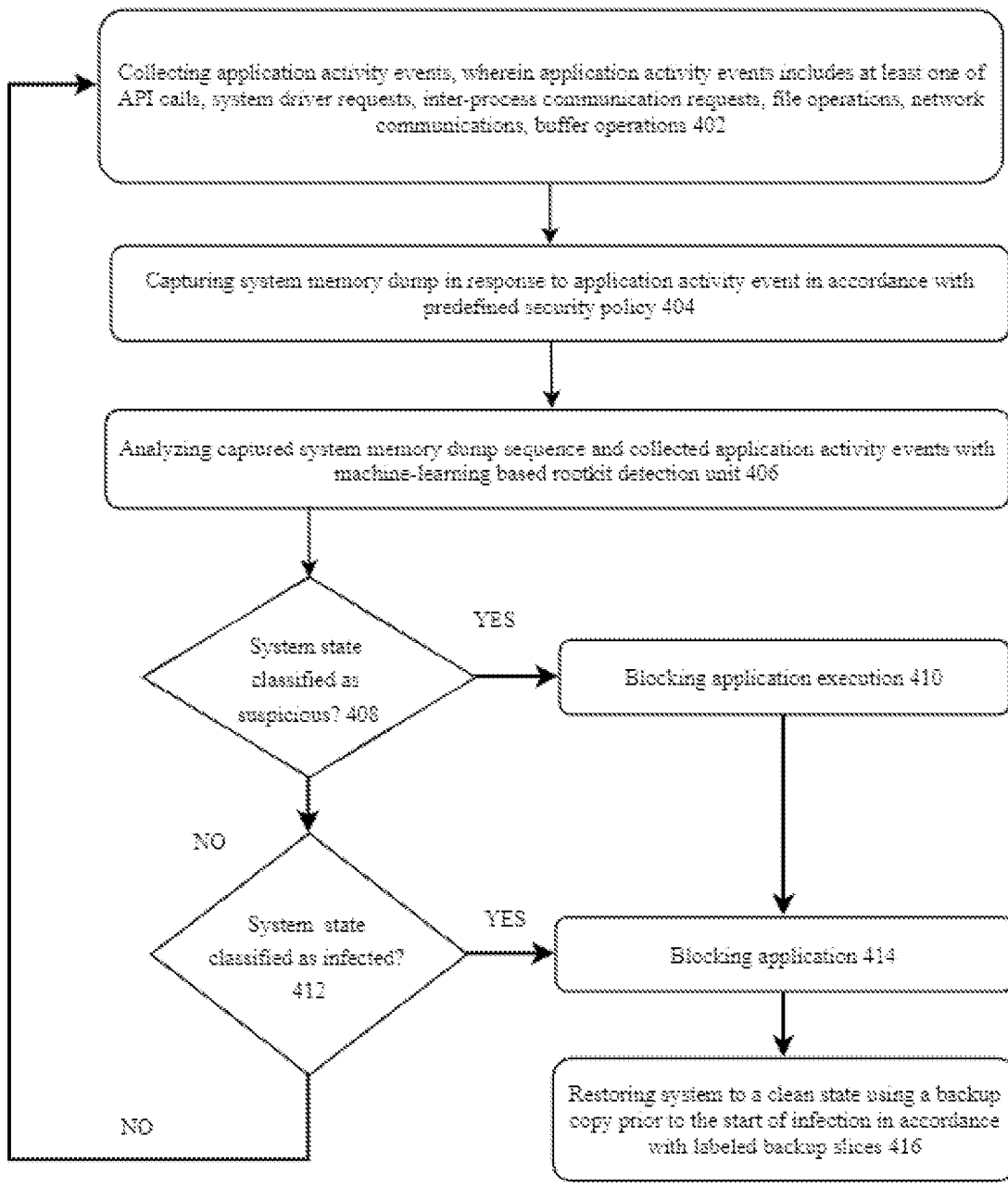
FIG. 4 describes a method block diagram for implementing the security unit and the backup unit, in accordance with the embodiment.

FIG. 4 describes a method block diagram for creating a backup copy of a system and restoring the system in a state prior to a malware attack, in accordance with one embodiment.

At block 402, application activity events are collected by a system event monitor. The application activity events include at least one of API calls, system driver requests, inter-process communication requests, file operations, network communications, buffer operations.

At block 404, system dump capture driver 304 captures system memory dump sequence in response to application activity event in accordance with predefined security policy.

At block 404, captured system memory dump sequence and collected application activity events are analyzed by the threat detection engine 304.

At block 408, it is determined, based on the analysis of threat detection engine 304 if the system is infected or not. If the rootkit is detected and the system state is classified as suspicious, a backup copy of the system state is stored and labeled.

Subsequently, the application execution is blocked at block 410 by security system 226.

If the system state is not classified as suspicious at block 408, it is to be determined whether the system state is infected, by security system 226, at block 412. If the system state is classified as infected, the application will be blocked at block 410.

At block 416, system is restored to a clean state using a backup copy prior to the start of infection in accordance with labeled backup slices, by backup unit 230.

At block 412, if the system state is classified as not infected, the method flow will return to block 402 and the method steps for rootkit detection will be repeated.

The invention claimed is:

1. A system for creating a backup copy of a computing system and restoring a system state of the computing system preceding the loading of an element causing malicious program execution, the system comprising:
    a microprocessor coupled to a nontransitory storage medium;
    a system event monitor, under microprocessor control, for intercepting and collecting one or more application activity events corresponding to the computing system in accordance with a predefined security policy;
    a system dump capture driver, under microprocessor control, configured to:
        capture a first memory dump and a second memory dump in response to the one or more application activity events in accordance with a predefined security policy, wherein the first memory dump corresponds to memory before application activity corresponding to intercepted application activity events, and the second memory dump corresponds to memory after application activity corresponding to intercepted application activity events, and
        generate a differential memory dump, wherein the differential memory dump is indicative of the difference between the first memory dump and the second memory dump;
    a rootkit detection engine, under microprocessor control, configured to:
        receive a system dump sequence as a first data input, and a system event sequence from the system event monitor as a second data input, wherein the system dump sequence comprises at least two differential memory dumps generated by the system dump capture driver and the system event sequence comprises intercepted application activity events corresponding to differential memory dumps in system dump sequence, classify a system state by executing a machine learning model based on the first data input and the second data input as a suspicious state;
    a backup unit, under microprocessor control, configured to:
        create sequential backup copies of the system memory dumps;
        index each sequential backup copy;
        store the sequential backup copies;
        retrieve, from the indexed sequential backup copies, a sequential backup copy corresponding to an event preceding an event characterizing the suspicious state of the system; and
        restore the computing system from a sequential backup copy comprising the system state preceding the detection of a malware using the index and without scanning to locate the sequential backup copy.

2. The system of claim 1, wherein the backup unit comprises a storage device and a data agent, and wherein the storage device is located on a hard memory or a server.

3. The system of claim 1, wherein the computing system is distributed and the backup unit is configured to run at a different location from the rest of the computing system.

4. The system of claim 2, wherein the backup unit is configured to use out-of-band network connectivity to access the storage device.

5. The system of claim 1, wherein the one or more application activity events comprises a system driver file operation, a process interconnection, a buffer operation, a network communication related to running applications, an Application Programming Interface (API) call, and a system driver request.

6. The system of claim 1, wherein the system event monitor is configured to monitor events corresponding to a threat behavior definition or a threat signature.

7. The system of claim 1, wherein the system event monitor is configured to generate a log of operation to determine the relationship between a determined suspicious state and an operation process that caused the suspicious state.

8. The system of claim 1, wherein the machine learning model has been trained on a collection of known malware, corresponding to a rootkit family, and further trained on a collection of known clean files, corresponding to one or more memory dumps of an uninfected computing system.

9. The system of claim 1, wherein the machine learning model comprises an artificial neural network.

10. The system of claim 1, wherein the system event monitor is implemented in user mode and kernel mode.

11. The system of claim 1, wherein the system event monitor, the system dump capture driver, the rootkit detection engine, and the backup unit are configured to run in a virtual machine.

12. A computer-implemented method for rootkit detection by analyzing system dump sequences in a computing system, the method comprising:
    collecting application activity events;
    capturing system memory dumps in response to a collected application activity event in accordance with a predefined security policy;
    analyzing collected system memory dump sequences and collected application activity events with a rootkit detection unit, wherein the rootkit detection unit comprises a machine learning model configured to classify a system state as suspicious;
    creating sequential backup copies of the collected system memory dump sequences;
    indexing each sequential backup copy;
    storing the sequential backup copies in a storage device;
    retrieving, from the indexed sequential backup copies, an indexed sequential backup copy corresponding to the system state preceding an event characterizing a suspicious state of the computing system; and
    restoring the computing system from the retrieved indexed sequential backup copy and without scanning to locate the indexed sequential backup copy corresponding to the system state preceding the event characterizing a suspicious state of the computing system.

13. The method of claim 12, further wherein the steps of creating sequential backup copies, indexing each sequential backup copy, retrieving an indexed sequential backup copy corresponding to the system state preceding an event characterizing a suspicious state of the computing system, and restoring the computing system from the indexed sequential backup copy are performed by a backup unit located remotely from the computing system.

14. The method of claim 13, further comprising accessing the storage device using out-of-band network connectivity by the backup unit.

15. The method of claim 12, further comprising monitoring events corresponding to a threat behavior definition or a threat signature.

16. A computer-implemented method for restoring a computer system from a sequential backup, the method comprising:
    creating a plurality of sequential backups from collected system memory dumps of the computer system;
    adding each sequential backup to an index;
    storing the indexed sequential backups in a storage device;
    identifying, by referring to the index, an indexed sequential backup corresponding to a memory dump taken immediately preceding an event characterized as a suspicious state of the computer system by a rootkit detection unit comprising a machine learning model; and
    restoring the computer system from the indexed sequential backup and without scanning to locate the indexed sequential backup.

17. The method of claim 16, wherein one or more steps are performed by a backup unit located remotely from the computer system.

18. The method of claim 17, wherein all steps are performed by a backup unit located remotely from the computer system.

19. The method of claim 18, further comprising accessing the storage device using out-of-band network connectivity by the backup unit.

20. The method of claim 19, further comprising monitoring events corresponding to a threat behavior definition or a threat signature.

* * * * *